United States Patent [19]
Pahle et al.

[11] Patent Number: 6,161,661
[45] Date of Patent: Dec. 19, 2000

[54] BRAKE DISC FOR A DISC BRAKING SYSTEM

[75] Inventors: Wolfgang Pahle, Heilbronn; Hans Baumgartner, Moosburg, both of Germany

[73] Assignee: Knorr-Bremse Systeme fur Nutzfahrzeuge GmbH, Munich, Germany

[21] Appl. No.: 09/529,958

[22] PCT Filed: Oct. 16, 1998

[86] PCT No.: PCT/EP98/06581

§ 371 Date: Jun. 6, 2000

§ 102(e) Date: Jun. 6, 2000

[87] PCT Pub. No.: WO99/23394

PCT Pub. Date: May 14, 1999

[30] Foreign Application Priority Data

Oct. 24, 1997 [DE] Germany .............................. 197 47 111

[51] Int. Cl.$^7$ ...................................................... F16D 65/12
[52] U.S. Cl. ............................. 188/218 XL; 188/264 AA; 188/251 A
[58] Field of Search ...................... 188/218 XL, 264 AA, 188/71.6, 264 A, 73.2, 251 A, 251 M; 192/113.2, 113.23, 113.26, 107 M; 420/15, 26; 148/321, 612

[56] References Cited

U.S. PATENT DOCUMENTS

| | | | |
|---|---|---|---|
| 5,032,194 | 7/1991 | Metzler | 148/321 |
| 5,139,117 | 8/1992 | Melinat | 188/264 AA |
| 5,323,883 | 6/1994 | Mibe et al. | 188/251 A |
| 5,427,212 | 6/1995 | Shimazu et al. | 188/218 XL |
| 5,492,205 | 2/1996 | Zhang | 188/264 AA |
| 5,706,915 | 1/1998 | Shimazu et al. | 188/264 AA |
| 5,878,848 | 3/1999 | Zhang | 188/218 XL |
| 5,948,353 | 9/1999 | Lawrence et al. | 420/15 |

FOREIGN PATENT DOCUMENTS

| | | |
|---|---|---|
| 143264 | 6/1985 | European Pat. Off. . |
| 9778355 | 6/1997 | European Pat. Off. . |
| 40 26 611 | 2/1992 | Germany . |
| 94 00 562 | 5/1995 | Germany . |
| 185 33 136 | 3/1996 | Germany . |
| 197 19 353 | 11/1997 | Germany . |
| 91-94983 | 7/1997 | Japan . |
| 2057609 | 4/1981 | United Kingdom . |
| 2307959 | 6/1997 | United Kingdom . |

*Primary Examiner*—Douglas C. Butler
*Attorney, Agent, or Firm*—Evenson, McKeown, Edwards & Lenahan, P.L.L.C.

[57] ABSTRACT

A brake disk has a thickness D1 and includes two friction plates disposed parallel to each other, between which an airflow duct having a width D2 is located in a substantially central position. The brake disk is made of a gray cast iron material containing molybdenum. The ratio of the disk thickness D1 to the airflow duct width D2 is $3.0 \leq D1/D2 \leq 5$. The brake disk has a great resistance to temperature change and a long operating life.

15 Claims, 2 Drawing Sheets

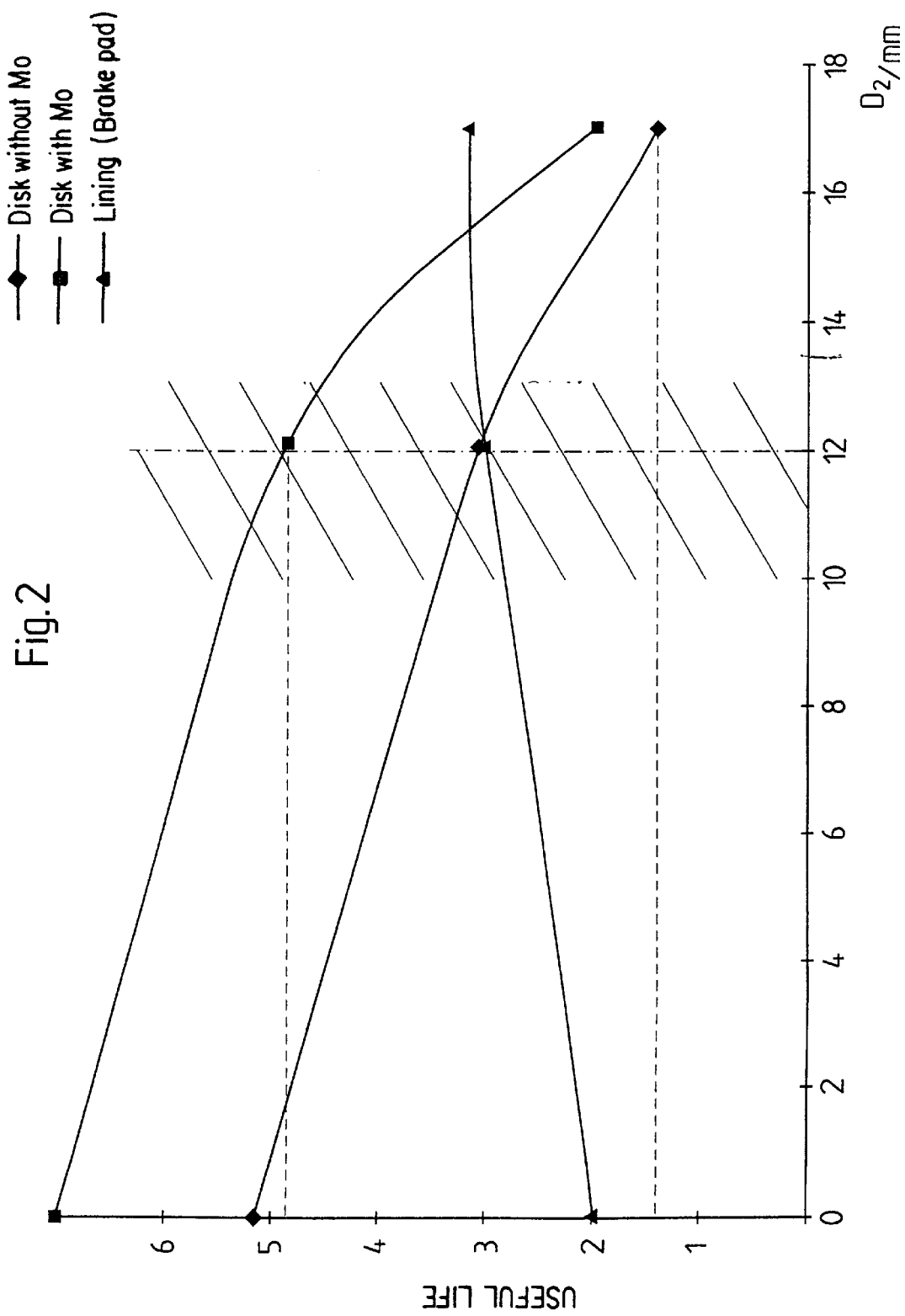

BRAKE DISC FOR A DISC BRAKING SYSTEM

BACKGROUND AND SUMMARY OF INVENTION

The invention relates to a brake disk for disk brakes, especially for disk brakes of utility vehicles.

In EP 0 778 355 A1 such a brake disk is disclosed, which has a disk thickness D1 and two friction disks arranged parallel to one another, between which an air channel lying substantially centrally with a width D2 is formed. The ratio between the disk thickness D1 and air channel thickness D2 is about 3.6 in a disk casting. The disk brake consists of a gray cast iron material with a relatively low molybdenum content of 0.01 to 0.6 percent.

It is already known also from WO96/07766 (PCT/SE95/00927) to provide the gray cast metal with an addition of molybdenum. However, it is stated in this publication that a molybdenum content of 0.3% or more is disadvantageous, since it makes the cost of the material increase too greatly and manufacture is difficult.

A brake disk of gray cast iron material with a molybdenum content is also disclosed in DE 40 26 611 C2.

The design of the generic brake disk has proven to be basically sound. In this connection, see DE 195 44 559 C1. There is a need for improvement, however, with regard to a further reduction of the disk's tendency to form cracks and with regard to increasing the life of the disk. The same problem is also true of the brake disk disclosed in DE 40 26 611 C2. Additional state of the art which deals with brake disks and their materials is disclosed in DE 44 26 0911 A1, DE 37 04 679 A1, DE-OS 22 35 627, DE 94 00 562 U1 and DE 87 08 264 U1.

Setting out from the generic state of the art the invention is addressed to the problem of optimizing the brake disk in regard to a further reduction of the tendency toward cracking and in regard to increasing the useful life.

The invention solves this problem in the generic brake disk and in brake disks in which the ratio between disk thickness D1 and air channel width D2 satisfies the condition $$3.0 \leq D1/D2 \leq 5,$$

that the brake disk consists of a gray cast iron material with a molybdenum content that amounts to 0.6 to 0.8 percent.

The invention thus again departs from the trend of the industry, according to which the width of the cooling channel is to be maximized in order on the one hand to enlarge the cooling streams between the friction rings and on the other hand to minimize the weight of the brake disk. The invention makes use of the knowledge that possibly too much attention has been paid to the parameter, "disk weight,"0 the past. Another feature of the brake disk of the invention is to be seen in the material, according to which a greater molybdenum content in the gray casting is between 0.6 and 0.8% again contributes to a decided lengthening of the life of the disk. In the experiment, increases of useful life of more than 40 percent, and typically even 60 percent, compared with variants with no molybdenum content.

The invention also, by the selection of the cooling channel width, increases the heat capacity and the rigidity of the brake disk, on the one hand, and at the same time reduces the brake disk to a genuine minimum. Thus, in the experiment under extreme conditions, the useful life until the disk cracks through is often even doubled and thus the life of the disk is definitely lengthened. Nevertheless, the cooling is only unimportantly poorer than in the case of the disks of the state of the art in which the ratio D1/D2 is around 2.5 to 2.8.

Especially preferred variants of the invention are distinguished by the fact that the ratio between disk thickness and air channel width satisfies the condition $3.0 \leq D1/D2 \leq 5$. At the same time the invention is especially suitable for brake disks with a diameter that is greater than or equal to 300 mm (e.g., 430 to 460 mm), the thickness D1 being about 45 mm and the air channel width D2 being 12 mm. This brake disk design is suitable for example for utility vehicle disk brakes with 22.5" (571.5 mm) [wheel rims], and it is especially advantageous for utility vehicle disk brakes with a ratio between the disk's inside diameter and the disk's outside diameter of about 0.6.

According to the invention the brake disk is made from a gray iron casting (iron, traces of other alloy metals and impurities caused by fusion) with the stated molybdenum content. Compared with conventional brake disks, the brake disk of the invention offers an increase of the useful life by a factor of 3 to 4, without thereby appreciably increasing the brake pad's liability to wear. Preferably, the molybdenum content of the gray casting is between 0.75% and 0.76%, especially at 0.752%. A special advantage of the high molybdenum content is that, being a microcarbide former, the molybdenum prevents the propagation of heat cracks in the brake disk. In contrast to the known niobium microcarbide former, molybdenum also increases the thermostability of the gray casting. Especially in combination with the geometric design of the invention, there is such an increase internal combustion engine he life of the disk that it even pays to increase the Mo content still further.

Advantageously, the gray cast iron also contains chromium (Cr) in an amount of 0.2 to 0.3%. Chromium forms the microcarbide in conjunction with the molybdenum. Preferentially the brake disk gray casting has a total of the following additives: C: 3.8–4%, Si: 1.4–1.8%, Mn: 0.6–0.8%, P: <0.1%, S: K 0.12%, Cr: <0.2–0.3%, Cu: <0.2%, Ni: <0.1%, Mo: 0.6 to 0.8% and V: <0.1%. dr

BRIEF DESCRIPTION OF THE DRAWINGS

The invention is further described below in connection with the drawing, wherein:

FIG. 2 is a test diagram of hot-crack tests.

DETAILED DESCRIPTION OF THE DRAWINGS

Figure 1:
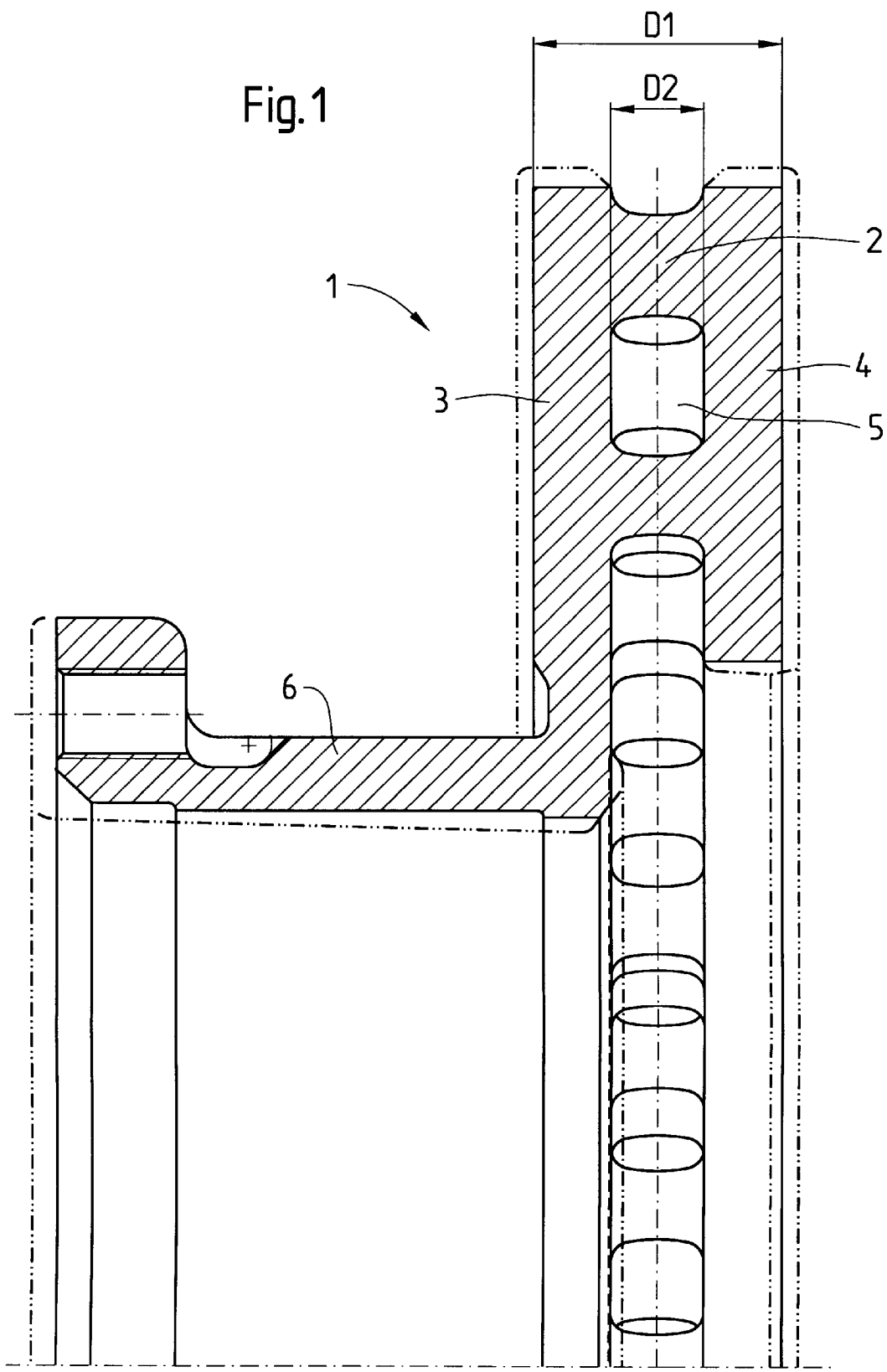
FIG. 1 is a partially sectioned view of a brake disk according to the invention.

The brake disk 1 has two friction disks 3 and 4 joined together by bridges 2, so that an air and cooling channel 5 is formed between the friction disks aligned parallel to one another. On the inner circumference of friction disk 3 a pot-like projection 6 is formed for the mounting of the brake disk 1 on a wheel axle. The brake disk 1 can also, of course, be made multipartite—e.g., in the manner of DE 195 44 559 C1—and/or it can be discontinuous.

The brake disk 1 represented in FIG. 1 is in practice made such that the total disk thickness D1 is 45 mm and the air channel width D2, 12 mm. In the case of brake disks whose air channel has a constant width, the width D2 is defined by the closest point. There is thus a ratio of D1 to D2 of 3.75 (in case of a wide diameter of 430–460 mm for 22.5" rims). In the state of the art the air channel width of 17 to 18 mm has been the established practice. The mass of the brake disk increases according to the cooling channel geometry (web size etc.) by only about 2–3 kg. It also proves advantageous that for the same energy input the temperature of the brake disk increases less than in the case of larger air channel width and thus less heat capacity.

Any further reduction of the cooling channel width D2 is uneconomical for production reasons, since the sand core for the formation of the air channel when the brake disk is cast is no longer manageable. The claimed ratio between the magnitudes D1 and D2 is rather an optimization of the brake disk geometry according to the parameters: danger of cracking, weight, cooling performance, producibility and economy.

FIG. 2 shows by way of example, with the aid of test diagrams of common stress and heat cracking tests, that in utility vehicle brake disks with a thickness D1 of 45 mm and a ratio between disk inside diameter and disk outside diameter around 0.6, with a reduction of the air channel width to about 12 mm (and to a value of around 12 mm in the hatched corridor), even in the case of a disk without Mo a clear prolongation of disk life beyond the life of a corresponding disk with an air channel width D2 of 17 mm can be attained. In comparison with the life of the "17 mm air-channel disk" the life increases by more than 100% when the air channel width is reduced to 12 mm. In the case of a brake disk of gray cast iron with a molybdenum content around 0.6–0.8%, especially 0.75% (and the following additional additives: C: 3.8–4%, Si: 1.4–1.8%, Mn: 0.6 to 0.8%, P: <0.1%, S: <0.12%, Cr: <0.2%, Ni: <0.1% and V: <0.1%) the useful life clearly increases again, especially when the air channel width of the disk with Mo added is around 12 mm. The life of the brake pad is reduced but minimally or not appreciably by the narrowing of the air channel.

We claim:

1. A brake disk for disk brakes, comprising:
   a disk having a thickness D1 and comprising two friction disks arranged parallel to one another and an air channel having a width D2 essentially centrally situated between the two friction disks;
   wherein a ratio between disk thickness D1 and air channel width D2 is $3.0 \leq D1/D2 \leq 5$,
   wherein the brake disk comprises a gray cast iron material having a molybdenum content of 0.6 to 0.8%.

2. A brake disk according to claim 1, wherein said brake disk has a diameter of at least 300 mm.

3. A brake disk according to claim 1, wherein said brake disk has a diameter of 430–460 mm.

4. A brake disk according to claim 1, wherein the thickness D1 is about 45 mm.

5. A brake disk according to claim 1, wherein the width of the air channel is about 12 mm.

6. A brake disk according to claim 1, wherein a ratio between a disk inside diameter and a disk outside diameter is about 0.6.

7. A brake disk according to claim 1, wherein the two friction disks are equally thick.

8. A brake disk according to claim 1, wherein the two friction disks are joined together by bridges.

9. A brake disk according to claim 1, wherein the brake disk is made as a discontinuous, multipartite brake disk.

10. A brake disk according to claim 1, wherein the Mo content of the gray cast iron is 0.75% to 0.76%.

11. A brake disk according to claim 1, wherein the gray cast iron contains chromium.

12. A brake disk according to claim 11, wherein the chromium content of the gray cast iron is 0.2 to 0.3%.

13. A brake disk according to claim 1, wherein the gray cast iron has the following additives:
    C: 3.8–4%,
    Si: 1.4–1.8%,
    Mn: 0.6–0.8%,
    P: less than 0.1%,
    S: less than 0.12%
    Cr: less than 0.2–0.3%,
    Cu: less than 0.2%,
    Ni: less than 0.1%,
    Mo: 0.6 to 0.8%,
    V: less than 0.1%.

14. A brake disk according to claim 1, wherein the ratio between disk thickness D1 and air channel width D2 is $3.2 \leq D1/D2 \leq 4$.

15. A utility vehicle disk brake comprising a brake disk according to claim 1, wherein said utility vehicle disk brake has 22.5 inch wheel rims.

* * * * *